United States Patent Office 3,269,573
Patented August 30, 1966

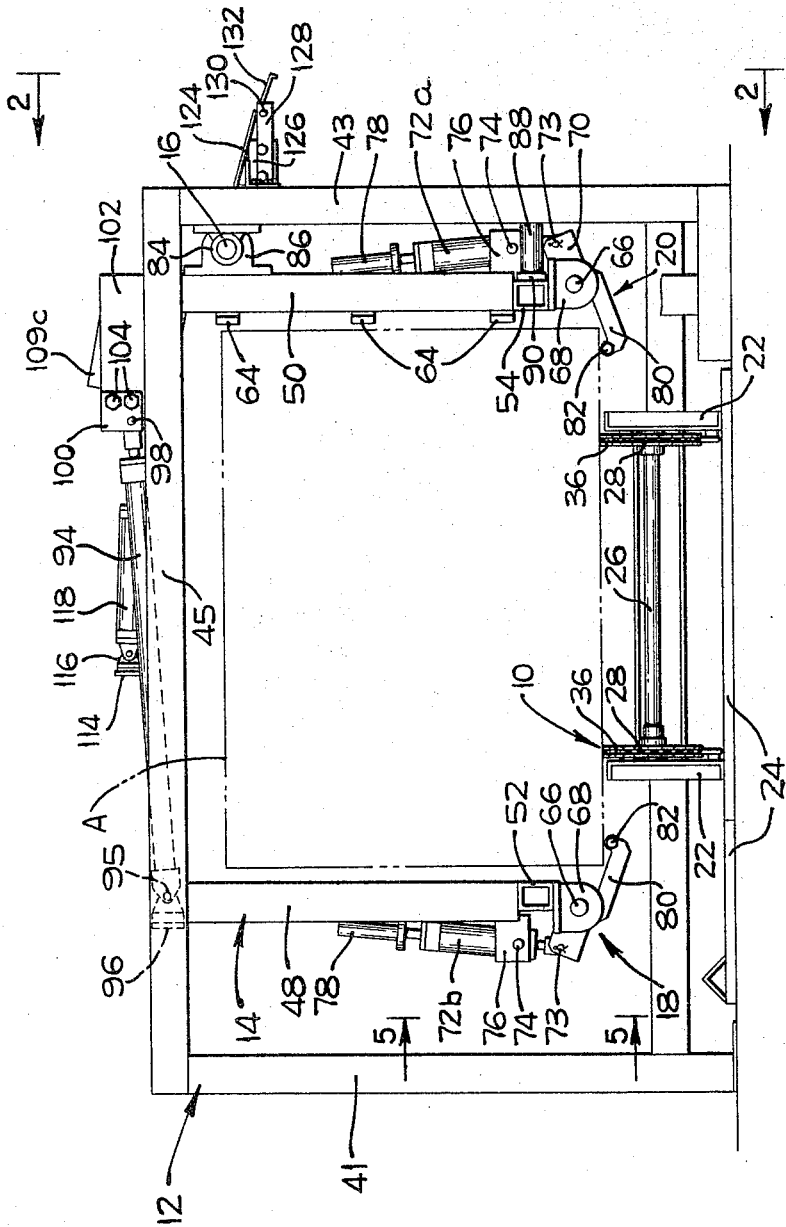

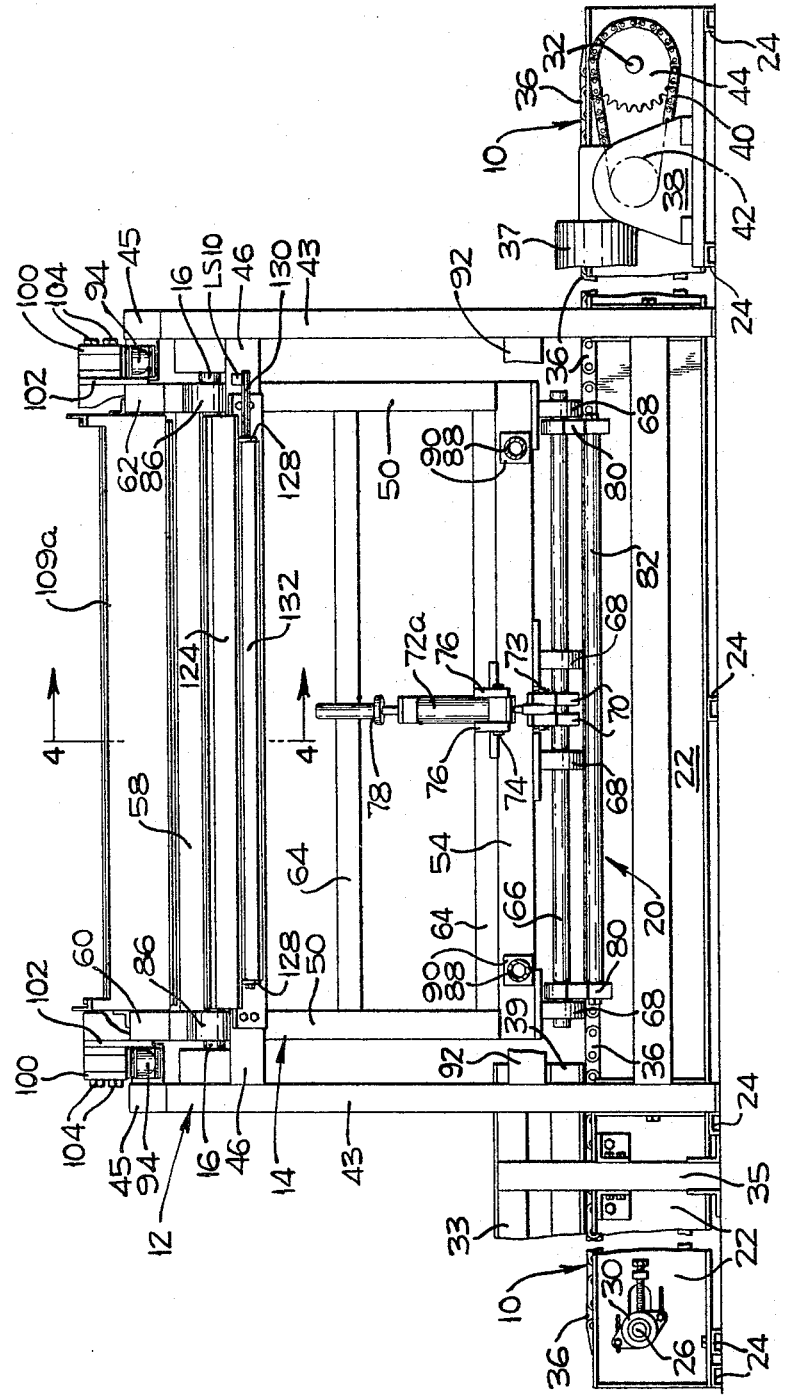

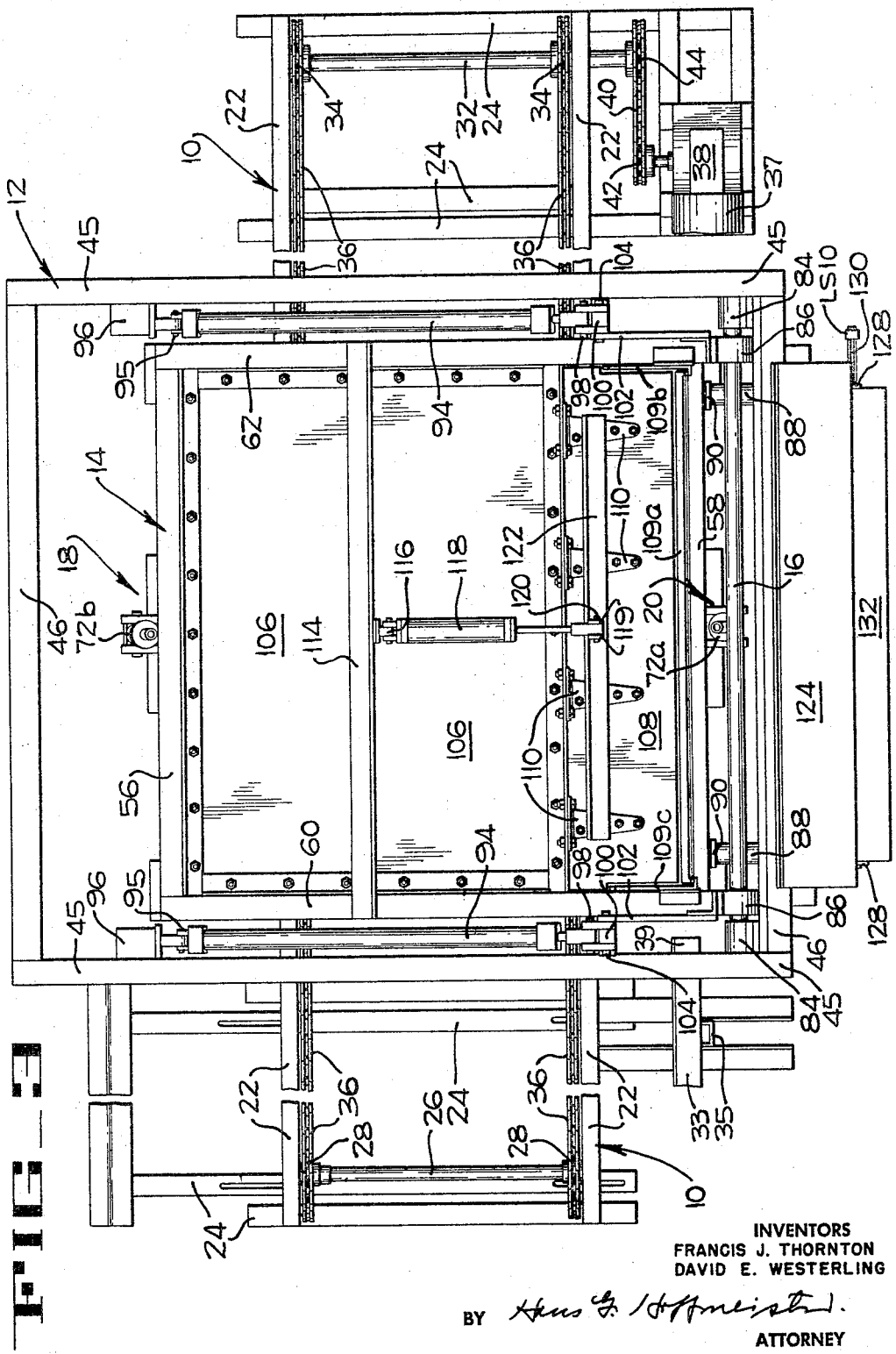

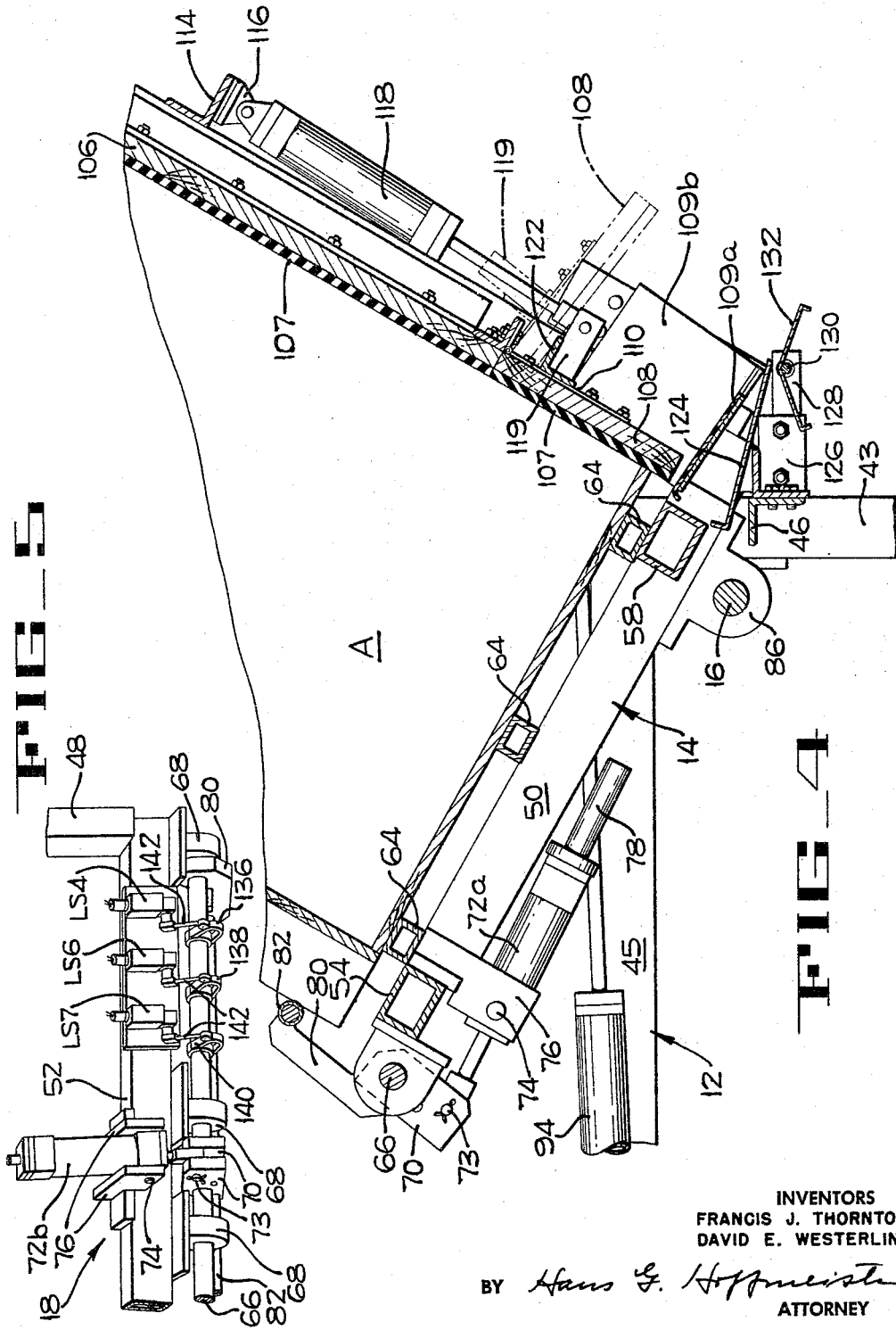

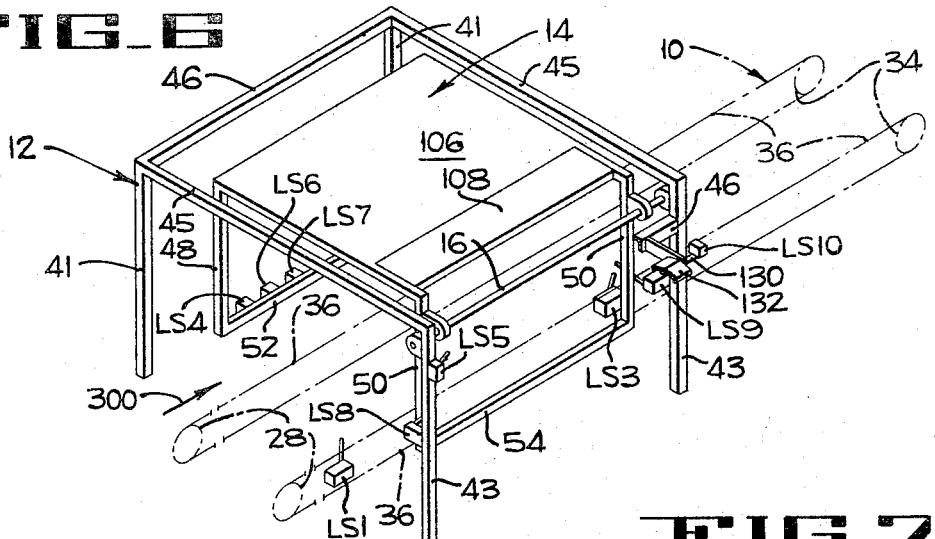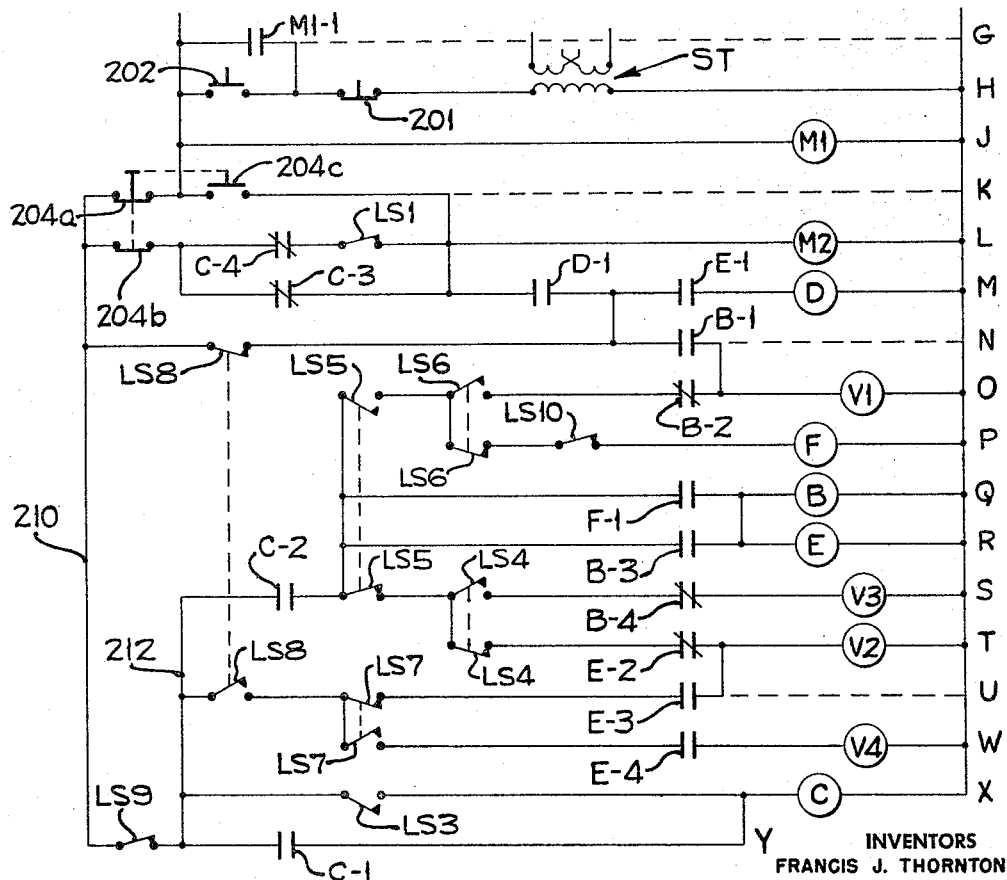

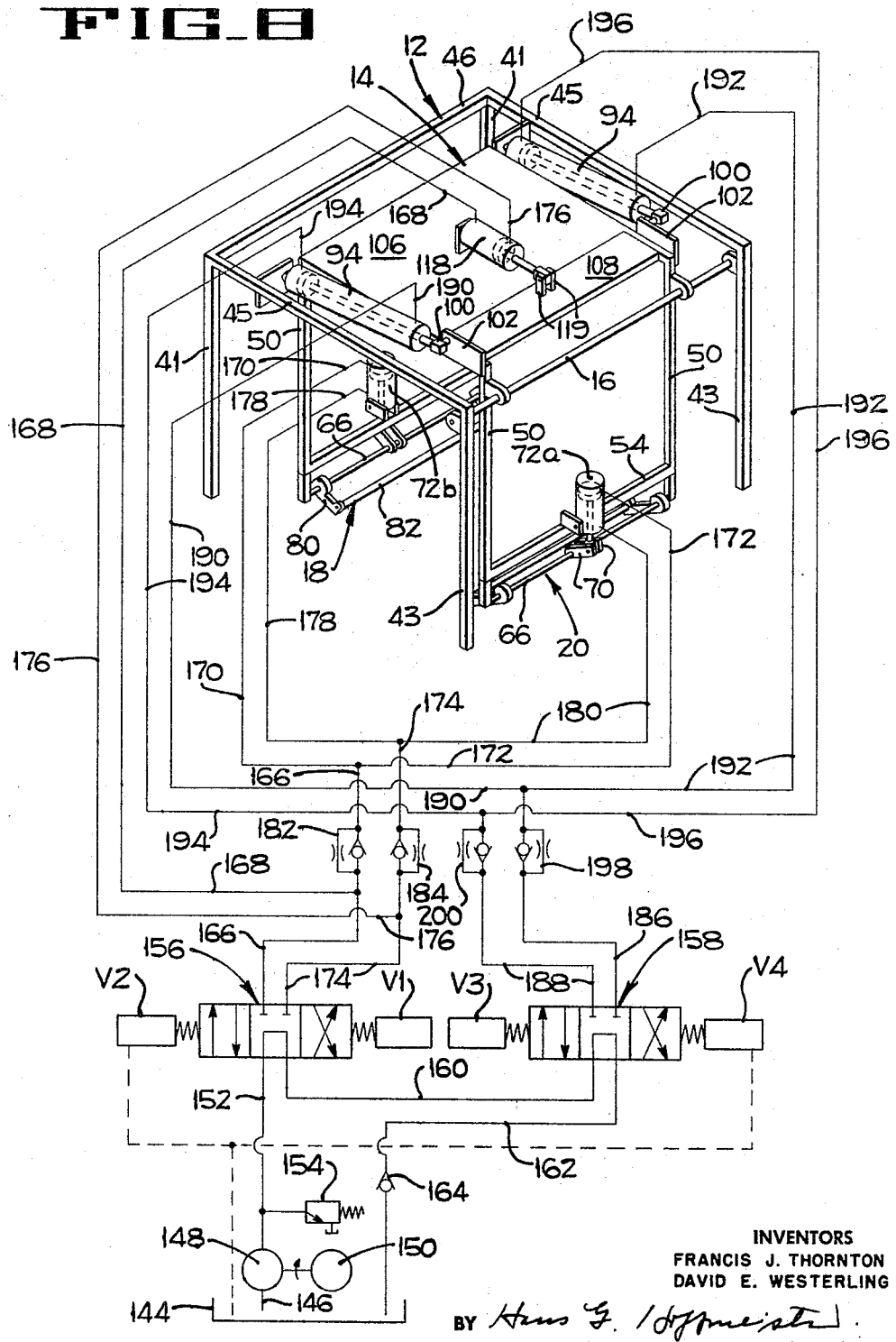

1

3,269,573
CONTAINER DUMPING APPARATUS
Francis J. Thornton and David E. Westerling, Riverside, Calif., assignors to FMC Corporation, San Jose, Calif., a corporation of Delaware
Filed Dec. 10, 1963, Ser. No. 329,416
10 Claims. (Cl. 214—307)

This invention relates to an apparatus for inverting containers or boxes, to discharge their contents for further processing or repackaging into shipping containers or boxes.

It is common practice to load produce or fruit being harvested into open-top field containers which are larger than the containers utilized for shipping the produce or fruit to market. Therefore it is necessary to transfer the fruit or produce into the smaller market-size containers. An inspection, sorting or other operation is usually performed before the market-size containers are filled.

When filled with fruit or produce, the field containers are quite heavy, therefore requiring mechanical power devices for tipping the containers and thereby discharging or dumping the contents onto a sorting table, while workers manually repack each item of produce or fruit into the market-size boxes. In certain instances, however, the contents dumped from the field boxes is transported, usually by belt conveyor, to processing machines that may size or wash the produce.

An example of prior art apparatus for dumping field containers is illustrated in the patent to G. M. Porter, 2,577,091, entitled, Covering Box Dumper, issued December 4, 1951, and assigned to the assignee of the present invention.

This invention represents an improved container dumping apparatus which can accommodate containers or boxes which vary in dimensions, whether they be smaller or larger than containers of a nominal size.

Accordingly, an object of this invention is to provide an improved container dumping apparatus.

Another object is to provide an apparatus which is operative to manipulate containers of varying sizes in order to dump the contents therefrom.

Another object is to clamp the open-ended top of a field container against a closing member of a container-manipulating device.

Another object is to provide a sequentially operable apparatus for emptying the field containers.

The manner in which these and other objects of this invention are attained, will become apparent from the detailed description of the invention that follows, taken in conjunction with the following drawings, in which:

FIGURE 1 is a front elevation of the container dumping apparatus constructed according to the present invention.

FIGURE 2 is a side elevation of FIGURE 1, viewed in a direction of the arrows 2—2 of FIGURE 1.

FIGURE 3 is a top plan of FIGURE 2.

FIGURE 4 is an enlarged cross section taken substantially along the lines 4—4 of FIGURE 2, showing the tilting frame in tilted position.

FIGURE 5 is a fragmentary perspective of FIGURE 1, when viewed along the lines 5—5 of FIGURE 1.

FIGURE 6 is a diagrammatic perspective showing the location of the various limit switches which effect sequential operation of the apparatus.

FIGURE 7 is a schematic of the electrical control circuit.

FIGURE 8 is a diagrammatic perspective of the dumping apparatus, showing the association of the hydraulic actuators, with the hydraulic control circuit for operating the actuators shown schematically.

2

Referring to FIGURES 1, 2 and 3, the illustrated machine embodying the present invention comprises several interrelated major components namely: a floor mounted box or container conveyor 10; an upright transverse stationary frame 12 bridging the floor conveyor 10; and a tilting frame 14 fitted between the longitudinal transverse ends of the stationary frame 12 and pivotable in a clockwise direction, as viewed in FIG. 1, about a horizontal shaft 16. The opposite sides of the tilting frame 14 include clamping structures 18 and 20, which are operative to clamp the illustrated container A onto the tilting frame 14.

The floor conveyor 10 comprises elongated transversely spaced channels 22, which rest on longitudinally spaced cross braces 24 that lay on the floor. An idler shaft 26, including sprockets 28, is journalled for rotation in bearings 30 (FIG. 2) which are longitudinally adjustably mounted on the channels 22. A driven shaft 32, including sprockets 34 (FIG. 3), is also journalled for rotation in the channels 22 at the container discharge end of the floor conveyor 10. Endless sprocket chains 36 are trained about the sprockets 28 and 34, with the upper run of each chain being supported to describe a path slightly above the upper surface of the channels 22, as shown in FIGS. 1 and 2. In this manner, the channels 22 do not interfere with the movement of the containers A along the conveyor 10. A conventional motor 37 and speed reducer 38 are provided for rotating the driven shaft 32, by a sprocket chain 40. Chain 40 runs over sprockets 42 and 44 mounted on the output shaft of the reducer, and the driven shaft 32, respectively. With such an arrangement of parts, containers deposited on the inlet end of the conveyor (the left end as viewed in FIGURES 2 and 3), are conveyed to the stationary frame 12 and the associated tilting frame 14, where means are provided for electrically deenergizing the motor 37 and accordingly interrupting circulation of the conveyor chains 36. This stops the containers under the frames 12 and 14.

A long guide rail 33 (only a portion being shown in FIGURES 2 and 3), supported above the floor by vertical posts 35, terminates at 39 adjacent the inner longitudinal extremity of the tilting frame 14. When containers are deposited on the inlet of the conveyor 10, a container side wall is positioned against the rail 33 so that it is in the correct transverse position when it arrives at the tilting frame 14.

As shown in FIGURES 1, 2 and 3, the stationary frame 12 comprises pairs of vertically extending legs 41 and 43, spaced laterally outwardly from the channels 22. The tops of the legs are interconnected by transverse and longitudinal braces 45 and 46, respectively, which are in turn rigidly secured to each other to thereby define an inverted U-shaped frame, as viewed in FIGURE 1, and of generally rectangular outline, as viewed in FIGURE 3. It will be noted by reference to FIGURE 1, that the transverse braces 45 are of a sufficient distance above the floor level to provide a relatively large clearance for the containers A which are moved thereunder by the conveyor 10.

The container tilting frame 14, also shown in FIGURES 1, 2 and 3, is similar in shape to the stationary frame 12, but is of reduced dimensions. This frame comprises pairs of vertical legs 48 and 50, located on opposite sides of the floor conveyor 10 and having the lower free ends thereof interconnected by braces 52 and 54 respectively. As shown in FIGURE 3, the upper ends of the pairs of legs 48 and 50 are rigidly connected to longitudinal bracing members 56 and 58, respectively, and by transverse members 60 and 62 thereby constituting an inverted U-shaped frame. The pair of legs 50 have spaced rails 64 secured thereto, which not only increase the rigidity of the tilting frame 14 but also guide the box or container A into the tilting frame.

Considered together, FIGURES 1 and 2 show the clamping structures 18 and 20 and since they are similar in construction the following description will be confined to the clamp 20. A rockshaft 66 is rotatably mounted in a plurality of axially aligned bearings 68, which are rigidly secured to the lower surface of the brace 54. Radially extending closely spaced links 70 are secured generally centrally to the shaft 66, and define a clevis connection to which is pivotally connected one end of the piston rod of a double-ended rod linear actuator 72a, by a pin 73. In turn, the cylinder of the actuator 72a is pivotally mounted by means of short trunnion pins 74 in brackets 76, which are rigidly secured to the brace 54. The other end of the piston rod extends from the upper end of cylinder 72a, and has adjustably secured thereto a flanged stop collar 78 which is operative to limit the amount of downward movement of the rod.

Spaced arms 80 are secured to the shaft 66, and the free ends of the arms are interconnected by a cylindrical bar 82, which is positioned to engage the bottom of the container A, as shown in FIGURE 1. The clamps 18 and 20 are simultaneously actuated and are operative to lift the container A from the chains 36, toward the upper end of the tilting frame 14, and press the open top of the container A against a wall, which will be hereinafter particularly described, provided on the tilting frame 14.

The clamps 18 and 20 operate in the following manner. Energization of the upper or head end of the linear actuators 72a and 72b with pressure fluid moves each rod downwardly, as viewed in FIGURE 1, rotating the shaft 66 associated with the clamp 18 in a counterclockwise direction, and the shaft 66 associated with the clamp 20 in a clockwise direction. In turn the arms 80, by virtue of being secured to the shafts 66, also rotate in the same direction as the shafts to which they are secured. The bars 82 engage and lift the container A off of the conveyor chains 36. It should be realized that by readjusting the collar 78 upwardly or downwardly on the rod of the actuators 72a and 72b respectively increases or decreases the stroke of the actuators and accordingly the length of arc described by the bars 82.

As was previously mentioned, the tilting frame 14 is pivotally movable relative to the stationary frame 12, about the horizontal pivot shaft 16. Means are provided for effecting limited pivotal movement of the tilting frame 14 about the horizontal shaft 16 in opposite direction, that is, clockwise and counterclockwise, as viewed in FIGURE 1. More particularly, the pair of vertical legs 43 of the frame 12 have elongated axially aligned tubular collars 84 which are rigidly connected to the legs, and which rigidly mount the horizontal shaft 16. The pair of legs 50 of the tilting frame 14 rigidly mount conventional pillow block bearings 86, through which the shaft 16 is disposed. Two stops 88 (FIGURES 2 and 3), each of which include a resilient pad 90, are mounted on a cross member 92 extending between the legs 43 of the stationary frame 12. The stops 88 determine the starting position of the tilting frame 14 which is shown in FIG. 1.

Pressure fluid powered means in the form of linear actuators 94, have head ends pivotally connected at 95 to brackets 96, which in turn are mounted on the transverse braces 45. The rod ends are pivotally connected at 98 to clevises 100. A generally rectangular, vertically oriented plate 102 is fixed to each of the transverse members 60 and 62 of the tilting frame 14. Bolts 104 secure the clevises 100 to the plates 102. Controls are provided, hereinafter particularly described, for simultaneously energizing the linear actuators 94 with pressure fluid. This causes outward movement of the piston rod associated with each actuator, thereby applying a turning moment to the tilting frame 14, and causing clockwise rotation of the entire tilting frame about the horizontal shaft 16.

The upper end of the tilting frame 14 is provided with a cover 106, which may be formed of wood or sheet metal as desired, including a door portion 108 that is pivotally connected to the cover 106 by hinges 110. The opening covered by the door 108 is surrounded by upwardly extending interconnected plates 109a, 109b and 109c which define a chute for guiding the contents of the container to a sorting table or surge conveyor (not shown). The cover 106 is secured to the lower surface of the longitudinal member 56 and the transverse members 60 and 62 in any desired manner. The lower surfaces of the cover 106 and the door 108, are provided with a layer of resilient material 107, such as foam rubber, which acts as a cushion for the fruit or produce in the containers A, when the tilting frame 14 is in its tilted orientation, as shown in FIGURE 4. A cross brace 114 (FIG. 3) is secured to the transverse members 60 and 62, and one portion of a clevis connection 116 is centrally mounted on the cross brace. The head-end of the cylinder of another linear actuator 118 is connected to the other portion of the clevis 116. The rod-end of the actuator 118 is pivotally connected between short laterally spaced plates 119, which are secured to an angle iron 122, mounted on the door 108. Admittance of pressure fluid into the rod-end of the actuator 118 opens the door 108, as shown in phantom line in FIGURE 4, and thus provides an opening through which the fruit discharges from the container A.

The right side of the stationary frame 12, as viewed in FIGURE 1, supports an inclined longitudinally extending plate 124, defining a chute for guiding the fruit or produce discharged through the door portion 108, to a belt conveyor or sorting table (neither of which are shown) located adjacent thereto. Longitudinally spaced brackets 126 are secured to one of the longitudinal braces 46 directly below the ends of the plate 124, and mount outwardly extending arms 128. A rod 130 (FIG. 2) is rotatably mounted in the arms 128. A longitudinally extending pan 132 is bent along its length (FIG. 4) and is secured along the line of the bend to the rod 130. In this manner, the rod 130 and the pan 132 rotate as a unit. The repose orientation of the pan 132 is shown in FIGURE 4. As shown in FIGURES 1 and 4, the outwardly extending portion of the pan 132 defines a continuation of the plate 124, and an item of produce or fruit rolling down the plate 124 also rolls on the pan 132, and in so doing imparts a slight rotational movement in a clockwise direction, as viewed in FIGURES 1 and 4, to the rod 130 and the pan 132. This slight rotational movement of the pan 132 serves to open or close a mercury limit switch, which is mounted on and rotates with the rod 130 for reasons to be explained.

The plate 124 not only insures that the fruit or produce will be guided to the outward edge of the pan 132 but also guards against jamming of any fruit or produce between the rear edge of the pan 132 and the adjacent portion of the stationary frame 12 thus inadvertent actuation of the mercury limit switch is prevented.

As shown in FIGURE 5, the shaft 66 of the clamp 18 has mounted thereon three limit switch actuating dogs 136, 138 and 140 that are operable to actuate respectively a plurality of limit switches LS4, LS6 and LS7, mounted on the brace 52. Each limit switch includes an operating arm 142 having a free end in contact with the dogs 136, 138 and 140, to effect actuation of the limit switches. Pressure fluid energization of the linear actuator 72b and corresponding rotation of the shaft 66, causes simultaneous rotation of the dogs 136, 138 and 140, thereby actuating the associated limit switches. The various limit switches and their location with respect to the floor conveyor 10, the stationary frame 12 and the tilting frame 14 is shown in FIG. 6, and their corresponding electrical association is shown in FIG. 7.

The limit switches LS4, LS6 and LS7, are electrically connected to solenoid operated hydraulic pilot valves V1, V2, V3 and V4 (FIG. 8), which control pressure fluid energization of the actuators 72a, 72b, 94 and 118, to accomplish sequential operation of the apparatus.

In addition to the limit switches LS4, LS6 and LS7, there are provided, on the upstream side of the frame 14, limit switches LS1 and LS3. Both of these switches are preferably mounted on the channels 22. These limit switches control the operation of the conveyor 10. The stationary frame 12 has a limit switch LS5, which is operative to stop the tilting movement of the frame 14, and a limit switch LS8, which is mounted on the leg 43, stops the downward tilt of the frame 14. The rotatably mounted rod 130 which supports the tilting pan 132, also supports a mercury limit switch LS10 (FIG. 6), on an outward extension of the rod 130, and is operative to close the door 108 and reclamp the bin to the cover 106. A limit switch LS9, slightly upstream from the dumping station, is actuated by an empty bin or container and is operative to hold off or electrically disconnect the control circuit, until the empty container is clear of the discharge station.

The hydraulic control circuit, shown schematically in FIGURE 8, for energizing the actuators 72a, 72b, 94 and 118 with pressure fluid includes a tank 144, which contains a quantity of suitable hydraulic fluid, the tank having a conduit 146 communicating with the inlet of a pump 148, which is driven by an electric motor 150. A pump discharge conduit 152 communicates with a conventional pilot operated relief valve 154, which is adjusted to establish a predetermined operating pressure in the system. A pair of two position, four connection, solenoid controlled, pilot operated four-way valves 156 and 158 is provided. These valves are connected in series by a branch conduit 160 to the pump discharge conduit 152. A conduit 162, including a check valve 164, returns the fluid to the tank 144. The four-way valve 156 includes solenoid operated pilot valves V1 and V2, which are selectively operated by certain elements of the control circuit shown in FIG. 7, to shift the associated spool of the valve 156 in either of opposite directions, and thereby control the flow of pressure fluid to and from the linear actuators 72a, 72b and 118. In like manner, the four-way valve 158 includes solenoid operated pilot valves V3 and V4, for shifting the spool associated therewith, and thereby control the flow of pressure fluid to or from the actuators 94.

A conduit 166, in communication with the pressure fluid outlet of the four-way valve 156, has a first branch conduit 168 communicating with the head-end of the door operating linear actuator 118, a second branch conduit 170 communicating with the head-end of the linear actuator 72b, and a third branch conduit 172 communicating with the head-end of the linear actuator 72a. Actuators 72a and 72b operate the clamps 20 and 18 respectively. Another conduit 174, connected to the four-way valve 156, is connected to a first branch conduit 176, which communicates with the rod-end of the door operating linear actuator 118, a second branch conduit 178 in communication with the rod-end of the linear actuator 72b, and a third branch conduit 180 in communication with the rod-end of the linear actuator 72a. Each of the conduits 166 and 174 includes check orifice valves 182 and 184, located downstream from the branch conduits 168 and 176, which are operative to permit metered flow in one direction and free flow in the opposite direction. For example, when the conduit 166 is in communication with the pump discharge conduit 152, the flow of pressure fluid in branch conduits 170, 172 is metered to equalize the rate of displacement of the actuators 72a and 72b in one direction. In a similar manner when the conduit 174 is in communication with the pump discharge 152, the check orifice valve 184 equalizes flow of pressure fluid in branch conduits 178 and 180, to equalize the rate of displacement of the actuators 72a and 72b in the opposite direction.

The four-way valve 158 has two outlet conduits 186 and 188. The conduit 186 is in communication with branch conduits 190 and 192, each of which is in communication with the rod-end of the actuators 94. The conduit 188 is in communication with branch conduits 194 and 196, which are in communication with the head-end of the actuators 94. Check orifice valves 198 and 200, located in conduits 186 and 188 respectively, are provided for equalizing the rate of displacement, whether it be extension or retraction, of the actuators 94.

The description of the operation of the electrical control circuit shown in FIG. 7 and the hydraulic control circuit shown in FIGURE 8 will be consolidated with the following description of the operation of this invention. The initial condition of the electrical and hydraulic circuit is as illustrated in FIGURES 7 and 8. Prior to depositing a container on the inlet end of the floor conveyor 10, the operator depresses a push button 202 in line H thereby completing a circuit through the secondary of a power supply transformer ST and through a normally closed stopswitch 201. This energizes a relay M1 in line J, and closes contacts M1–1 in line G, thereby energizing the pump motor 150. Through the normally closed limit switch LS1 in line L, and normally closed contacts 204a and 204b in lines K and L respectively, the floor conveyor relay M2 in line L is energized, closing the contacts (not shown) which electrically connects the motor 37 to the source of power causing orbital movement of the chains 36. The apparatus is now in condition to receive a filled container A, which is deposited on the inlet of the floor conveyor 10, and moved in a direction of the arrow 300 toward the tilting frame 14. The limit switch LS1 in line L is opened by the moving container (FIG. 6), de-energizing the relay M2 in line L, and disconnecting the conveyor motor 37 from the source of power. Jog switch 204c in line K is manually closed and held closed by the operator, re-energizing the relay M2, and re-connecting the motor 37 to the source of power, to thereby move the container under the tilting frame 14. As the trailing end of the container clears limit switch LS1, the switch returns to its closed position, and the operator releases the jog switch 204c in line K. The relay M2 is again energized by the contacts 204a in line K and the contacts 204b in line L.

The normally open limit switch LS3 in line X is positioned to be closed by the container, when the container is under the tilting frame 14. The closing of LS3 by the full container, energizes a relay C in line X, which in turn closes the normally open contacts C–1 in line Y, closes the normally open contacts C–2 in line S, opens normally closed contacts C–3 in line M and opens normally closed contacts C–4 in line L. The relay M2 in line L is now de-energized, disconnecting the motor 37 from the source of power, and again bringing the floor conveyor 10 to rest.

Closing of the contacts C–2 in line S as described above, energizes the solenoid V2 of the four-way valve 156, shifting the spool of the valve to the right and establishing communication between the supply conduit 152 and the conduit 166. This causes the head-end of the actuator 118, and the head-end of the actuators 72a and 72b, to be energized with pressure fluid. As a consequence, the door 108 is closed, and the clamps 18 and 20 lift the container A off of the floor conveyor, and clamp it against the cover 106 of the tilting frame 14.

Actuation of the linear actuator 72b rotates the shaft 66 and the dogs 136, 138, and 140 (FIG. 5), which actuates the limit switches LS4, LS6 and LS7. At this time, the normally open contacts of LS4 in line S are closed, and the normally closed contacts of LS4 in line T are opened. Also the normally closed contacts of LS7 in line U are opened, and the normally open contacts of LS7 in line W are closed. At the same time, the normally closed contacts of LS6 in line P are opened, and the normally open contacts of LS6 in line O are closed. With this disposition of the limit switches, current is conducted to the normally closed limit switch LS9, by a branch line 210, and from the limit switch LS9 to the now closed contacts C–2, by a branch line 212. This electrically energizes the solenoid V3 in line S, shifting the spool of four-way valve 158 to the right (FIG. 8), establishing communication between the conduits 160 and 162 with conduits 188 and 186 respectively. The head-ends of the linear actuators 94 are now energized with pressure fluid flowing through the branch conduits 194 and 196, rotating the tilting frame 14 about the horizontal shaft 16 through an angle of approximately 120 degrees, to the position shown in FIGURE 4.

As soon as the frame 14 commences its tilting movement, limit switch LS8, having contacts in lines N and U, is actuated so that the normally closed contacts in line N are opened, and the normally open contacts in line U are closed, to condition the solenoid coil V4 in line W for operation. Tilting movement of the frame 14 is arrested by a limit switch LS5, which is positioned to be actuated by the frame 14. This limit switch includes two sets of contacts, one of which is in line S and the other in line O. Upon actuation of the limit switch LS5 by the tilting frame 14, the normally open contacts in the line O close, and the normally closed contacts in line S open. Opening of the contacts of LS5 in line S de-energizes the solenoid V3, returning the spool of the four-way valve 158 to the position shown in FIGURE 8, blocking the pressure fluid in the head ends of the linear actuators 94. This holds the frame 14 in its tilted position.

Closing the contacts of LS5 in line O, energizes the solenoid V1 through the closed contacts of LS6, and through the normally closed contacts B–2. Energizing the solenoid V1 shifts the spool of the four-way valve 156 to the left, as viewed in FIG. 8, connecting the conduits 166 and 174 with the conduits 160 and 152 respectively. In this manner, pressure fluid is conducted through the conduit 174 to the branch conduits 176, 178 and 180, pressurizing the rod-ends of the actuators 118, 72a and 72b.

Since communication is concurrently established between the conduits 166 and 160, the pressure fluid in the head-ends of the actuators 118, 72a and 72b is discharged through the conduits 168, 170 and 172 back to the tank 144, through the conduits 166, 160 and 162. Pressurizing the rod-end of the actuator 118, opens the door 108 allowing the contents of the container A to flow through the doorway onto and across the pan 132.

It should be recalled that the pan 132 is secured to the pivotally mounted rod 130, therefore as the contents of the container flow through the doorway onto the pan 132, the pan rotates clockwise, as viewed in FIGURE 4, and the mercury limit switch LS10, mounted on the rod 130, connects the line P to the circuit whenever a pan 132 is in the tilted position.

Unclamping of the container A while the frame is in its tilted position, returns the limit switches LS4, LS6 and LS7 to their original position shown in FIGURE 7.

A time delay relay F in line P is energized through the closed contacts of LS5 in line O, and through the contacts of LS6 in branch line P, which are also closed. The mercury limit switch LS10 in line P remains closed as long as the pan 132 is being tilted by the contents of the container passing thereover. After the container has been emptied, the pan 132 returns to its repose position shown in FIGURE 4, de-energizing the time delay relay F, which is constructed so that a 15 second time interval passes before relay F actually becomes de-energized. During this time delay the operator can determine, by visual inspection, if the container is actually empty and if not, limit switch LS10 can be manually closed by tilting the pan 132. The remaining items of produce or fruit are then pulled out by hand.

During energization of the relay F, the contacts F–1 in line Q close, energizing the relays B and E in lines Q and R. Energization of B closes the normally open contacts B–1 in line N, opens the normally closed contacts B–2 in line O, closes normally open contacts B–3 in line R, and opens normally closed contact B–4 in line S. Energization of relay E closes normally open contacts E–1 in line M, opens normally closed E–2 in line T, closes normally open E–3 in line U, and closes normally open contacts E–4 in line W. This conditions solenoids V2 and V4 for operation. At the end of the 15 second time interval, the contacts F–1 in line Q open, but the relay B remains energized through the closed contacts B–3 in line R.

Before the frame 14 returns to its tilted down position, the container is again reclamped to the cover 106. The solenoid V2 is energized through the closed contacts of LS7 in line U, and the closed contacts E–3 also in line U, thereby energizing the solenoid V2, and again pressurizing the head-ends of the linear actuators 72a and 72b. This clamps the bin to the cover 106, and pressurizes the head-end of the linear actuator 118 closing the door 108.

The contacts of the limit switch LS7 in line W are closed when the bin is clamped to the cover 106, and the solenoid V4, through the closed contacts E–4 is energized shifting the spool of the valve 158 to the left. This connects the conduit 188 with the return conduit 162, and the conduit 186 with the conduit 160. Pressure fluid at pump discharge pressure is therefore directed into the rod end of the linear actuators 94, through the conduits 190 and 192 thus tilting the frame 14 to its position straddling the floor conveyor 10.

The first few degrees of rotation of the frame 14 opens the contacts of LS5 in line O, and closes the contacts of LS5 in line S. When the frame 14 arrives at its fully tilted down position, the limit switch LS8 is actuated, closing the contacts in line N, and opening the contacts in line U. This de-energizes the solenoid V4, and returns the spool of the valve 158 to its neutral position. The solenoid V1 in line O is energized through the closed contacts of LS8 in branch line N and through the closed contacts B–1 in the same line, shifting the spool of the four-way valve 156 to the left. This pressurizes the rod-ends of the linear actuators 72a and 72b, and the linear actuator 118, lowering the container and opening the door 108.

Lowering of the container through the actuation of the actuators 72a and 72b returns the contacts of the limit switches LS4, LS6 and LS7 to the position shown in FIGURE 7. The closed contacts of LS8 in line N energizes relay D in line M, through the closed contacts E–1. Energization of the relay D closes contacts D–1 in line M, energizing the relay M2 in line L, restarting the floor conveyor motor 37, and thereby moving the empty container to the discharge end of the floor conveyor. Continued movement of the empty container in the direction of the arrow 300, causes actuation of the limit switch LS9, which disconnects the control circuit until the empty container is clear of the discharge station. Opening of LS9 de-energizes the relays B, C, D, and E and the relay M2 remains energized through the normally closed limit switch LS1 in line L and the now closed contacts C–4.

The above-described sequence of operation is again repeated when another full container is deposited on the inlet of the floor conveyor 10.

The hydraulic four-way valves 156 and 158 can be of the type manufactured by Vickers Inc., Machinery Hydraulics Division, of Waterbury, Conn., and designated by the Serial No. DG5S4–068C–2–41.

From the foregoing description it will be evident that the present invention provides a dumping apparatus that is simple in construction, and yet is automatically sequentially operable to manipulate field containers. The door on the tilting frame permits the contents to be gradually discharged therefrom, thereby reducing the number and the force with which the contents collide. This minimizes bruising of the contents.

It will be understood that modifications and variations of the illustrated embodiment may be made without departing from the scope of the invention.

Having thus described the invention, what is claimed as new and is desired to be protected by Letters Patent is:

1. In a container dumping apparatus, the combination of: an invertible frame for overlying an open-topped container; a conveyor for moving the container in underlying relationship to said frame; wall means on said frame for extending over the top of the container; power operated devices underlying opposite sides of the bottom of the container for lifting the container from said conveyor and holding it against said wall means, and a hinged door in said wall means providing an opening through which the contents of the container are discharged when said frame is inverted.

2. In a container dumping apparatus, the combination of: a support frame; an inverted U-shaped container dumping frame pivotally connected to said support frame; a conveyor for positioning open-top containers adjacent said container dumping frame; pressure fluid responsive device pivotally connected to said frames for pivoting said dumping frame relative to said support frame; other pressure fluid responsive devices for lifting a container from said conveyor and clamping it to said dumping frame; a hinged door on said dumping frame providing an opening through which the contents of the container are discharged when said dumping frame is pivoted upwardly; and control means for operating said first and second mentioned devices sequentially.

3. In a container dumping apparatus, the combination of: a container conveyor; an inverted U-shaped frame straddling said conveyor; a supporting frame pivotally mounting said U-shaped frame; means for locating a container under said U-shaped frame; clamping devices on said U-shaped frame for lifting the container from said conveyor and rigidly clamping the container to said U-shaped frame; and means responsive to the operation of said clamping devices for pivoting said U-shaped frame with the container clamped thereto relative to said supporting frame.

4. A container dumping apparatus comprising conveying means for moving a loaded open-top container; means straddling said conveyor for lifting and rotatably translating a loaded container so that the contents gravitationally discharge therefrom; means on said lifting and translating means for covering the top of the container; door means in said covering means for permitting the contents of said container to discharge therefrom; and control means responsive to the position of the container and said lifting and translating means for effecting successively, interruption of said conveying means when the container is located adjacent said lifting and translating means, actuation of said lifting and translating means, opening of said door means when the container is tilted, and returning said lifting and translating means to its starting position after the contents have been discharged from the container.

5. A container dumping apparatus comprising conveying means for moving a loaded open-top container; a container inverting frame straddling said conveyor for lifting and rotatably translating a loaded container so that the contents gravitationally discharge therefrom; said inverting frame including a wall for covering the top of the container; door means in said wall for permitting the contents of said container to discharge therefrom; control means responsive to the position of the container and said frame for effecting successively, interruption of said conveying means when the container is located adjacent said lifting and translating frame, actuation of said lifting and translating frame, opening of said door means when the container is tilted, and returning said lifting and translating frame to its starting position after the contents have been discharged from the container; and means for restarting said conveyor when the empty container is returned to its starting position.

6. A container dumping apparatus comprising conveying means for moving a loaded open-top container; a container inverting device straddling said conveyor; clamping means on said device for lifting and clamping a container to said device; each of said clamping means including a pressure fluid responsive linear actuator; a shaft rotated by said actuator; and a clamping bar, positioned to engage the bottom of the container, operated by said shaft; means on said device for covering the top of the container; door means in said covering means for permitting the contents of said container to discharge therefrom; and control means responsive to the position of the container and said device for effecting successively, interruption of said conveying means when said container is located adjacent said device, actuation of said clamping means, opening of said door means when said container is tilted, and returning said device to its starting position after the contents have been discharged from the container.

7. A container dumping apparatus comprising an elongate conveyor, an inverted U-shaped frame located intermediate the longitudinal ends of said conveyor and having pairs of vertical legs located adjacent the sides of said conveyor, pressure fluid operated linear actuators operably mounted on each pair of said vertical legs, rock shafts rotatably mounted on each pair of vertical legs, interconnected arms secured on each of said rock shafts and terminating closely adjacent the sides of said conveyor, linkage means connecting the output of said actuators to said rock shafts, means operating said actuators for effecting limited rotation of said shafts and said arms in opposite directions to position the ends of said arms above the conveying reach of said conveyor, a wall on said U-shaped frame extending between and secured to the upper end of said legs, wherein location of a container by said conveyor between said pairs of legs and subsequent operation of said actuators causes said arms to engage the bottom of the container and press it against said wall.

8. An apparatus for dumping open-top containers comprising an elongate conveyor, an inverted U-shaped frame located intermediate the longitudinal ends of said conveyor and having pairs of vertical legs located adjacent the sides of said conveyor, pressure fluid operated linear actuators operably mounted on each pair of said vertical legs, rock shafts rotatably mounted on each pair of vertical legs, interconnected arms secured on each of said rock shafts and terminating closely adjacent the sides of said conveyor, linkage means connecting the output of said actuators to said rock shafts, means operating said actuators for effecting limited rotation of said shafts and said arms in opposite directions to position the ends of said arms above the conveying reach of said conveyor and thereby lift the container off of said conveyor, a wall including a door on said U-shaped frame extending between and secured to the upper end of said legs defining a cover against which the container is clamped, and means for pivoting said frame so that the contents may be discharged from the container.

9. A container dumping apparatus comprising an elongate conveyor for conveying an open-top container along a predetermined path, an inverted U-shaped frame located between the longitudinal ends and extending transverse to the longitudinal median of said conveyor, said frame having the legs thereof transversely spaced a sufficient distance to allow passage of such a container therebetween, means mounting said frame for tilting movement in a direction transverse to the longitudinal median of said conveyor, means responsive to the location of the container between the legs of said frame for interrupting operation of said conveyor thereby bringing the container to rest between the legs of said frame, said frame including an upper wall extending between the legs thereof defining a cover for the top of the container, a door in said wall, power operating devices on said legs for lifting the container from said conveyor and pressing the top against said wall, and means for tilting said frame in the mentioned direction and opening said door to permit the contents of the container to be gravitationally discharged therefrom.

10. A container dumping apparatus comprising an elongate conveyor for conveying an open-top container along a predetermined path, an inverted U-shaped frame located between the longitudinal ends and extending transverse to the longitudinal median of said conveyor, said frame having the legs thereof transversely spaced a sufficient distance to allow passage of such a container therebetween, means mounting said frame for tilting movement in a direction transverse to the longitudinal median of said conveyor, means responsive to the location of the container between the legs of said frame for interrupting operation of said conveyor thereby bringing the container to rest between the legs of said frame, said frame including an upper wall extending between the legs thereof defining a cover for the top of the container, a door in said wall, power operated devices on said legs for lifting the container from said conveyor and pressing the top thereof against said wall, means for tilting said frame in the mentioned direction and opening said door to permit the contents of the container to be gravitationally discharged therefrom, and means for detecting completion of the discharge so that said frame may be returned to its initial position straddling said conveyor.

References Cited by the Examiner

UNITED STATES PATENTS

| | | |
|---|---|---|
| 2,651,087 | 9/1953 | Fellows. |
| 2,664,218 | 12/1953 | Johnson et al. _____ 214—307 |
| 2,875,912 | 3/1959 | Thresher et al. _____ 214—654 |
| 3,119,271 | 1/1964 | Tomasovich _____ 214—307 X |
| 3,136,437 | 6/1964 | Shimmon _____ 214—307 |

HUGO O. SCHULZ, *Primary Examiner.*

GERALD M. FORLENZA, *Examiner.*

A. GRANT, *Assistant Examiner.*